United States Patent

Hayashi

[11] Patent Number: 5,932,985
[45] Date of Patent: Aug. 3, 1999

[54] PROCESS OF CONTROLLING NUMERICALLY CONTROLLED BACK-AND-FORTH RUNNING TREATING MACHINE

[75] Inventor: Shigeki Hayashi, Tama, Japan

[73] Assignee: Nusco Co., Ltd., Tokyo, Japan

[21] Appl. No.: 08/961,522

[22] Filed: Oct. 30, 1997

[30] Foreign Application Priority Data

Nov. 13, 1996 [JP] Japan ................................. 8-301957

[51] Int. Cl.$^6$ ............................ G05D 23/275; B26D 1/56
[52] U.S. Cl. ...................... 318/560; 318/561; 318/632; 364/475; 83/318; 83/37
[58] Field of Search ................................. 318/560–646, 318/274, 63, 86; 83/54, 318, 320, 37, 63, 76, 766, 286, 305, 94, 65; 364/472, 474.35, 475, 118; 164/154, 168, 348

[56] References Cited

U.S. PATENT DOCUMENTS

| | | | |
|---|---|---|---|
| 3,809,986 | 5/1974 | Visser | 318/561 |
| 4,099,113 | 7/1978 | Hayashi | 318/632 |
| 4,112,999 | 9/1978 | Gasper | 164/154 |
| 4,266,276 | 5/1981 | Hayashi et al. | 364/475 |
| 4,600,865 | 7/1986 | Caputo | 318/274 |
| 5,105,700 | 4/1992 | Kusakabe | 83/318 |
| 5,850,772 | 12/1998 | Hayashi | 83/37 |

*Primary Examiner*—Paul Ip
*Attorney, Agent, or Firm*—Pollock, Vande Sande & Amernick

[57] ABSTRACT

A treating period $T=L_0/V$ is determined from a preset treating length $L_0$ and a stock running speed $V$. An advancing acceleration is made as small as possible consistent with a requirement that an advancing time $T_F$ of the treating machine (=advancing positioning interval $t_1$+settling time $t_s$+treating interval $t_c$+retracting deceleration interval $t_2$) is equal to or less than $T/2$ and a requirement that $(t_1/2+t_s)V$ assumes a given value. Both a retracting acceleration and a retracting speed are made as small as possible consistent with a requirement that an advanced distance is equal to a retracted distance and a requirement that a stop positioning interval $t_6$ is made as close to a minimum value as possible.

10 Claims, 4 Drawing Sheets

PROCESS OF CONTROLLING NUMERICALLY CONTROLLED BACK-AND-FORTH RUNNING TREATING MACHINE

BACKGROUND OF THE INVENTION

The invention relates to a process of controlling a treating machine which runs back and forth along a flying stock such as rod or sheet material and in which a drive to treat the stock is performed by a numerical control (NC) at the instant a speed synchronization is achieved between the machine and the stock after the latter is allowed to travel through a distance corresponding to a preset length determined for the intended treatment.

Subsequent to the invention disclosed in Japanese Patent No. 898,649, entitled "Digital servo flying cutter", a change was made from a mechanical drive to a numerically controlled drive in that a reciprocatory flying cutter in which a carriage having a cutter mechanism mounted thereon is started in following relationship with a running stock such as slab, rod, tube or the like to move in the same direction as the stock in order to cut the latter on its fly, whereupon the movement of the carriage is reversed to return to its home position. Since then, the disclosed reciprocatory flying cutter has been developed into a variety of forms and manners such as a die set shear including a pair of upper and lower cutting edges which are impacted by a press into meshing engagement, a running cut-off carriage which carries a rotary saw or disk cutter together with a mechanism which presses the saw or cutter against the stock, a running carriage mounting a cutting mechanism which operates as a milling machine. For information of the related art, refer to U.S. Pat. No. 4,099,113 (issued Jul. 4, 1978) and U.S. Pat. No. 4,266,276.

The numerical control is not limited to the field of cutting mechanisms, but is currently finding applications in running carriages on which treating mechanisms of other types are mounted as well. The other applications include, for example, a reciprocatory running treating machine which carries a variety of dies to perform a boring or notching operation on a running molded material or a reciprocatory running treating machine on which a mechanism is mounted which enables the application of a printing, and a heating or an overlay application to a running film, paper or cloth.

As an example of NC drive used with a conventional back-and-forth running machine of the kind described, a cutter is shown in FIG. 1. A running stock 11 passes in rolling contact with a length measuring roll 12, which activates a length encoder 13, which in turn produces a pulse for each given increment of travel of the stock 11. A length counter 14 is cleared at the time the cutting operation is completed, for example, by a signal from a sensor which detects a crank angle corresponding to the completion of the cutting operation in the arrangement of FIG. 1. Accordingly, a count in the length counter 14 indicates a run length $L_1$ which the stock 11 has run since the time the counter is cleared.

On the other hand, there is provided a back-and-forth running cutter which travels back and forth along the stock 11. Specifically, a cutter holder 15 carries a rack 16 which meshes with a pinion 17, which in turn is coupled through a reduction gear 19 with a motor 18 to be driven for rotation. An encoder 21 is mounted on the end of the motor shaft and produces a pulse, which is fed to length counters 22, 23 to be counted thereby. It is to be noted that the length counter 22 is cleared at the same time as the length counter 14. Accordingly, the length counter 22 indicates a travel length $L_2$ of the cutter holder 15 from a home position.

A desired cut length $L_0$ which is loaded in a presetter 24 and the counts $L_1$, $L_2$, of the length counters 14, 22 are input to an adder 25, which then delivers a length to go or remaining length E, which is given by $L_0-(L_1-L_2)=L_0-L_1+L_2$.

The control aims at reducing the remaining length E to zero, but it is unavoidable that the cutting operation is initiated before E is reduced to zero, and in such instance, the residual deviation $e_0$ is not discarded, but is incorporated into the next cut length $L_0$. Thus $E=L_0-L_1+L_2+e_0$.

The remaining length E is converted into a speed $V_B$ in a numerical speed converter 26 which provides a root function $V_B=K\sqrt{E}$ in order to change the speed $V_B$ linearly as the remaining length E is reduced, thus maintaining the acceleration constant. A frequency-to-speed converter 29 converts a pulse frequency from the length encoder 13 into a stock running speed V, from which the speed $V_B$ is subtracted in an adder 31, which thus delivers $V_C=V-V_B$. As long as a sign decision unit 32 renders a determination of $V_C<0$ or that the remaining length E is long, a change-over switch 33 controlled by the sign decision unit 32 selects $V_D$ rather than $V_C$ as a speed reference $V_{RE}$. Since the length counter 23 is preset by a home sensor 20 to a distance $H_L$ to an actual home, it follows that at the time of completion of the cutting operation which takes place as a result of forward or advancing movement of the cutter holder 15, a count $L'_2$ in the counter 23 is a high value while an output $V_D=-K\sqrt{L'_2}$ from a numerical speed converter 34 is a negative high value. A root function is used for $V_D$ in the same manner as for $V_B$ in order to change $V_D$ linearly as $L'_2$ is reduced, thus maintaining the acceleration constant.

The pulse from the encoder 21 is also applied to a frequency-to-speed converter 35, which detects the speed of rotation of the motor 18. An output from the converter 35 is fed as a speed feedback signal to an adder 36, where the speed feedback signal is subtracted from the speed reference $V_{RE}$ which is fed from the switch 33 through a limiter 27. An output from the adder 36 is used to drive the motor 18 through an amplifier and driver circuit 37. The circuit 37 comprises a thyristor converter when the motor 18 is a d. c. motor, or comprises a PWM vector inverter when the motor is an a. c. motor.

Immediately after the completion of the cutting operation, the remaining length E is long as mentioned previously, and hence $V_C<0$, and $V_D$ is selected as the speed reference $V_{RE}$. $V_D$ assumes a negative high value, and if the switch 33 applies $V_D$ stepwise to the limiter 27, the limitation on the slew rate by the limiter 27 allows $V_{RE}$ to be changed at a given gradient in order to limit the motor 18 to its allowable torque. Accordingly, the cutter holder 15 is decelerated at a given acceleration and directly moves into the reversing zone. As the home is approached, a deceleration positioning mode is entered and followed by a stop positioning mode with $V_0 \approx 0$ until $V_C$ is selected by the switch 33.

As the stock 11 continues to run, the length $L_1-L_2$ by which the stock 11 leads the cutting edge on the cutter holder 15 approaches the desired length $L_0$. As $V_B=K\sqrt{E}$ is reduced, there occurs a reversal in sign or $V_C=V-V_B \geq 0$. When this is detected by the sign decision unit 32, the switch 33 changes the selection from $V_D$ to $V_C$. As $V_B$ decreases linearly, $V_C$ increases linearly, thus producing a linear acceleration. Subsequently an on-the-fly positioning mode is entered in which the running of the stock 11 is tracked in order to maintain $V_B \approx 0$. At this time, the remaining length E is given as follows:

$$E = L_0 - L_1 + L_2 + e_0 = e'_0$$

The current residual deviation $e'_0$ is approximately equal to the previous $e_0$, and consequently, we have $$L_0 - L_1 + L_2 \approx 0 \text{ or } L_0 \approx L_1 - L_2.$$

In a press cutting operation as illustrated in FIG. 1, a cutting command is issued prior to the remaining length E approaching zero in anticipation of a mechanical lag in initiating the cutting operation. In response to the command, a clutch 38 is turned on and the torque from a flywheel 39 which is maintained in rotation by a motor 41 is transmitted to a crank mechanism 42 to rotate it, whereupon a press 43 is pressed down toward the bed to allow an upper cutting edge 44, as assisted by a lower cutting edge 45, to cut off the stock 11. In response to a cutting complete signal from a sensor which detects the angle of the crank mechanism 42, the clutch 38 changes from its off condition to starting its operation as a brake. A retract signal is derived from this signal, and serves entering the residual deviation $e'_0$ of the remaining length E and the desired cut length $L_0$ and clearing the length counters 14,22. The speed reference is then again switched from $V_C$ to $V_D$, whereby the cutter holder 15 retracts toward the home position.

While the press with the clutch/brake is illustrated in FIG. 1, a cutter is also available which improves the cutting performance through the numerical control of the motor 41 without using the clutch/brake 38 and the flywheel 39 (see Japanese Registered Utility Model No. 1,725,847). In either instance, a cutter of the kind described will be referred to as "die set shear" herein. By contrast, there are many arrangements in which the entire cutting mechanism is mounted on a carriage, which then operates while running. Such an arrangement will be referred to as "cut-off carriage" herein.

A control circuit formed by hardware is shown in FIG. 1, but it should be noted that the use of a computer for digital processing of the control action up to an amplifier which precedes a drive circuit, representing the power section in the amplifier and drive circuit 37, is increasing recently. In this instance, the function of the circuit arrangement shown in FIG. 1 is achieved by software. Instead of the length measuring roll disposed in rolling contact, it is currently possible to employ a non-contact sensor such as a laser Doppler sensor for obtaining a length measuring pulse.

As mentioned previously, there are back-and-forth running machines of the kind described in various forms and manners, but the numerical control remains basically the same. Accordingly, the speed waveform of the motor 18 is fundamentally as illustrated in FIG. 2A. Specifically, the cutter holder 15 is accelerated at a constant acceleration for a time interval $t_1$, which represents an advancing positioning mode. The speed and the cut length are settled in an advancing settling time interval $t_s$, and subsequently, the stock 11 is cut in a cutting time interval $t_c$ (inclusive of associated time intervals before and after the cutting) while the holder is running at the advancing speed V. Upon completion of the cutting operation, a constant deceleration is applied for a deceleration time interval $t_2$ to reach a speed of zero, and then a retracting acceleration is applied for a retracting acceleration time interval $t_3$ for retracting movement. When a retracting speed $V_R$ is reached, the holder is allowed to retract at this speed for a retract running time interval $t_4$. The holder is then decelerated at a constant rate for a time interval $t_5$, which represents the deceleration for purpose of retract positioning. After the holder remains at rest for a stop positioning time interval $t_6$, it again enters the advancing acceleration.

Machine specifications

For more than twenty years since Japanese Patent No. 898,649 which triggered the popular use of numerically controlled back-and-forth running cutters, a major concern with the machine specifications of cutters of that kind has been the capability of how short a cut length can be achieved with what level of stock running speed (or line speed).

Thus L-V curve shown in FIG. 2B represents one of the important machine specifications. In FIG. 2B, the abscissa represents a cut length L while the ordinate represents a stock speed V which permits a cutting operation. A saturation speed $V_{MAX}$ which is attained for larger values of L is often dictated, not only by the cutter itself, but by the line specifications across the cutter. Since a design which satisfies an L-V curve required as the specification has a direct bearing on the present invention, a detailed discussion will be given below in terms of numerical examples.

Shortest cut length $L_{MIN}$ at maximum speed $V_{MAX}$

A combination of the machine and the stock determines a cutting interval $t_c$. This is not always equal to a time interval necessary for the cutting operation, for example, a time interval $t_{co}$ required from the commencement of the rotary saw to descend, then turning to rise, until it clears the stock.

Where a die set shear is operated to cut at the center of the press, the cutting interval $t_c$ must include a waiting time since the alignment of the center of the cutter holder 15 with the position on the stock which is to be cut must be waited for before initiating the cutting operation. Where a stock which is cut by a milling cut-off carriage must be conveyed to a subsequent delivery point, the cutting interval $t_c$ must include a conveying time which follows the cutting operation.

For purpose of subsequent description, the following discrimination is made:

Type A: a machine having a cutting interval $t_c$ which is equal to the interval $t_{co}$ required for only the cutting operation, Type B: a machine having a cutting interval $t_c$ which includes a time interval $t_{c1}$ required for positioning before the cutting operation, and Type C: a machine having a cutting interval $t_c$ which includes a time interval $t_{c2}$ required for positioning after the cutting operation.

Numerical examples

An example is given to obtain an L-V curve on the basis a speed waveform shown in FIG. 2C. It is assumed that $V_{MAX}$=2.5 m/s, maximum retracting speed $V_{RMAX}$ of the cutter holder 15=3.0 m/s, acceleration $\alpha_m$=2.5/0.2=12.5 m/s², and $t_s$=0.1 s. For the sake of simplicity, it is assumed that $t_c$=0.2 at $V_{MAX}$ for any of types A, B and C, since the machine design is such that either $t_{c1}$ or $t_{c2}$ may be equal to zero at $V_{MAX}$. Then we have $$t_1 = t_2 = V_{MAX}/\alpha_m = 2.5/12.5 = 0.2 \text{ s}$$

$$t_3 = t_5 = V_{RMAX}/\alpha_m = 3.0/12.5 = 0.24 \text{ s}$$

Because the cutter holder 15 retracts by the length it advanced, $$((t_1+t_2)/2+t_s+t_c)V_{MAX} = ((t_3+t_5)/2+t_4)V_{RMAX} \qquad (1)$$

applies. Hence, when choosing $t_4$=0.1777 and $t_6$=0.1, the period T of the cutting operation is equal to 1.457, and $L_{MIN}$=T×α$V_{MAX}$=3.64 m.

The stock cannot be cut to a length less than $L_{MIN}$ using $V_{MAX}$. With the numerical control that has been used heretofore, for $L_0$ which is greater than $L_{MIN}$, there occurs an increase in $t_6$ only, and in other respects, the speed waveform remains unchanged.

A shortest cut length $L_m$ at each line speed V is determined.

$$((t_1+t_2)/2+t_s+t_c)V=((t_3+t_5)/2+t_4)V_{RMAX} \quad (2)$$

$$(t_1+t_s+t_c+t_2+t_3+t_4+t_5+t_6)V=L_m \quad (3)$$

$$t_1=t_2=V/12.5,\ t_3=t_5=V_{RMAX}/12.5=0.24 \quad (4)$$

using these equations, when $t_4<0$ occurs, the speed waveform is changed to one shown in FIG. 2D where the constant speed retracting interval $t_4$ is made equal to zero. In this instance, the above equations (2) to (4) are changed as follows $$((t_1+t_2)/2+t_s+t_c)V=(t_3+t_5)V_R/2 \quad (5)$$

$$(t_1+t_s+t_c+t_2+t_3+t_5+t_6)V=L_m \quad (6)$$

$$t_1=t_2=V/12.5,\ t_3=t_5=V_R/12.5 \quad (7)$$

For type A: using $t_s=0.1$, $t_c=0.2$ and $t_6=0.1$ as chosen before, specific values of V are substituted into the equations (5) to (7), thus determining values of $L_m$ as indicated below.

| V | $t_1$ | $t_c$ | $t_4$ | $V_R$ | $t_3$ | T | $L_m$ |
|---|---|---|---|---|---|---|---|
| 2.5 | 0.2 | 0.2 | 0.177 | 3.0 | 0.24 | 1.457 | 3.64 |
| 2.3 | 0.184 | 0.2 | 0.131 | 3.0 | 0.24 | 1.379 | 3.17 |
| 2.1 | 0.168 | 0.2 | 0.088 | 3.0 | 0.24 | 1.304 | 2.74 |
| 1.9 | 0.152 | 0.2 | 0.046 | 3.0 | 0.24 | 1.23 | 2.34 |
| 1.7 | 0.136 | 0.2 | 0.007 | 3.0 | 0.24 | 1.159 | 1.97 |
| 1.5 | 0.120 | 0.2 | — | 2.779 | 0.222 | 1.084 | 1.63 |
| 1.3 | 0.104 | 0.2 | — | 2.562 | 0.205 | 1.018 | 1.19 |
| 1.1 | 0.088 | 0.2 | — | 2.310 | 0.185 | 0.946 | 1.04 |

For type B: Usually a machine design does not require a waiting interval $t_{c1}$ at $V_{MAX}$. Conversely, the length from the home position to the position where the cutting position is initiated is determined at $V_{MAX}$ as follows $$(t_1/2+t_s+t_{c1})V_{MAX}=(0.2/2+0.1+0)\times 2.5=0.5\ m$$

For $V<V_{MAX}$, the presence of $t_{c1}$ is necessary to achieve the same value of 0.5 m. Thus from equations given below $$(t_1/2+t_s+t_{c1})V=0.5\ m,\ t_1=V/12.5\ \text{and}\ t_s=0.1,$$

$t_{c1}$ can be determined, and applying specific values of V while keeping $t_6=0.1$ unchanged, $L_m$ is obtained from the period T as indicated below.

| V | $t_1$ | $(t_1/2+t_s)V$ | $t_{c1}$ | $t_4$ | T | $L_m$ | $\Delta L_H$ |
|---|---|---|---|---|---|---|---|
| 2.5 | 0.2 | 0.5 | 0 | 0.1767 | 1.457 | 3.64 | 0 |
| 2.3 | 0.184 | 0.4416 | 0.0254 | 0.1505 | 1.424 | 3.28 | 0.0584 |
| 2.1 | 0.168 | 0.3864 | 0.0541 | 0.1227 | 1.393 | 2.93 | 0.136 |
| 1.9 | 0.152 | 0.3344 | 0.0712 | 0.0914 | 1.347 | 2.56 | 0.1656 |
| 1.7 | 0.136 | 0.2856 | 0.1261 | 0.0785 | 1.357 | 2.31 | 0.2144 |
| 1.5 | 0.120 | 0.24 | 0.1733 | 0.0567 | 1.35 | 2.03 | 0.26 |
| 1.3 | 0.104 | 0.1976 | 0.2326 | 0.0359 | 1.357 | 1.76 | 0.3024 |
| 1.1 | 0.088 | 0.1584 | 0.3105 | 0.0161 | 1.383 | 1.52 | 0.3416 |

In order to save the waiting time $t_{c1}$, the home position may be advanced previously. Denoting the distance from the original home to the advanced home position by $\Delta L_H$, $t_{c1}$ can be dispensed with if $\Delta L_H$ is chosen as indicated below.

$$\Delta L_H=0.5-(t_1/2+t_s)V$$

Numerical examples of $\Delta L_H$ are listed in the Table given above. Thus, in this instance, while the machine is of type B, the speed waveform becomes the same as for type A as is $L_m$. In other words, $L_m-\Delta L_H$ represents a new version of $L_m$, which is identical to the $L_m$ for type A.

For type C: A machine design usually does not require the provision of the conveying time $t_{c2}$ at $V_{MAX}$. Thus $$(t_1/2+t_s+t_c)V_{MAX}=(0.2/2+0.1+0.2)\times 2.5=1\ m$$

This means that the print of delivery is located at 1 m from the home position. For $V<V_{MAX}$, $t_c=t_{c0}+t_{c2}=0.2+t_{c2}$ are obtained from $(t_1/2+t_s+t_c)V=1$, and hence $L_m$ is determined by substituting specific values of V.

| V | $t_1$ | $(t_1/2+t_s+t_{c0})V$ | $t_{c2}$ | $t_4$ | T | $L_m$ | $\Delta L_H$ |
|---|---|---|---|---|---|---|---|
| 2.5 | 0.2 | 1.0 | 0 | 0.1767 | 1.457 | 4.00 | 0 |
| 2.3 | 0.184 | 0.9016 | 0.0428 | 0.1639 | 1.412 | 3.25 | 0.0984 |
| 2.1 | 0.168 | 0.8064 | 0.0922 | 0.1521 | 1.368 | 2.87 | 0.1936 |
| 1.9 | 0.152 | 0.7144 | 0.1503 | 0.1415 | 1.326 | 2.52 | 0.2856 |
| 1.7 | 0.136 | 0.6256 | 0.2202 | 0.1318 | 1.284 | 2.18 | 0.3744 |
| 1.5 | 0.120 | 0.54 | 0.3067 | 0.1234 | 1.243 | 1.86 | 0.46 |
| 1.3 | 0.104 | 0.4576 | 0.4172 | 0.1159 | 1.204 | 1.57 | 0.5424 |
| 1.1 | 0.088 | 0.3784 | 0.5651 | 0.1095 | 1.666 | 1.28 | 0.6216 |

In order to save the conveying time $t_{c2}$, the home position may be advanced previously. Denoting the distance from the original home to the advanced home position by $\Delta L_H$, $t_{c2}$ can be dispensed with by a choice as given below.

$$\Delta L_H=1-(t_1/2+t_s+t_{c0})V$$

Numerical examples of such $\Delta L_H$ are listed in the Table given above. In this instance, while the machine is of the type C, the speed waveform remains the same as for the Type A, as is $L_m$.

The numerically controlled back-and-forth running cutter has acceleration/deceleration $\alpha_m$ which remains fixed at a value representing a stringent requirement. This causes a high mechanical impact, and a repeated application of the impact has a significant influence upon the machine life. Oscillation caused by the impact acts as an external disturbance, increasing a variation in the cut length. specifically, the choice of the acceleration $\alpha_m$ is made on the basis of the L-V curve which represents the machine specification so as to establish an acceleration which enables a cutting to the shortest cut length $L_m$ including $L_{MIN}$ on the L-V curve. It will be noted that an operation of the machine with a line speed V less than $V_{MAX}$ and for a cut length $L_0$ greater than $L_m$, or an operation in a region below the L-V curve which is shown hatched in FIG. 2B, merely results in increasing the length of the stop interval $t_6$ if the conventional numerical control is followed. In practice, however, almost all operations take place, not on the L-V curve, but below it. Various back-and-forth running treating machines referred to above establish an acceleration $\alpha_m$ along the preset treating length $L_0$-stock speed V curve, which is the machine specification similar to that of the conventional cutter, and the acceleration/deceleration relative to the working bed is fixed to the $\alpha_m$ thus established, which is seen to be a harsh requirement upon the machine.

It is an object of the invention to provide a process of numerically controlling a back-and-forth running treating machine which allows an alleviation of the acceleration and a reduction in the retracting speed on the basis of the line speed V and the preset length $L_0$ in a tenable manner for the machine.

SUMMARY OF THE INVENTION

In accordance with the preset invention, at least one of an advancing acceleration, a retracting acceleration and a retracting speed is modified to bring a stop positioning interval $t_6$ as close to a minimum value as possible during a treatment period T which is determined by a preset treating length $L_0$ and a stock running speed V.

During the advancing control, requirements are adopted that the advancing time, $T_F$, may be half the treatment period T or less and that a travel length of the treating machine from the commencement of advance until the position for treating interval $t_c$ is reached is made substantially uniform. The advancing acceleration is made as low as possible consistent with these requirements. However, another requirement is added that the advanced distance be restricted to be equal to or less than the maximum possible run length $S_{MAX}$. Also during the advancing control, for a variety of machine which requires a positioning time interval before or after the treatment, the advance of the treating machine is started earlier by an amount corresponding to the product of either positioning interval and the stock running speed V.

During the retracting control, the retracting acceleration and the retracting speed are made as low as possible within a time that remains after subtracting the advancing time $T_F$ from the treatment period T consistent with a requirement that a minimum stop positioning interval can be secured.

Techniques to determine the advancing acceleration, a distance gained by starting the advance earlier, the retracting acceleration and the retracting speed as well as specific numerical examples will be described below for a cutter as an example.

At this end, a calculation formula is obtained initially which allows the acceleration to be reduced to as small a value as possible while avoiding to fix the acceleration. This may be served by choosing a small value for K in the characteristic $V=K\sqrt{D}$ for the numerical speed converters 26,34 shown in FIG. 1, and a justification for this will be discussed below with reference to FIG. 3.

Denoting the maximum acceleration by $\alpha_m$, an acceleration time until V is reached using the acceleration $\alpha_m$ by $t_{1m}$, a distance over which this acceleration takes place by $D_m$, and the characteristic of the numerical speed converter used by $V=K_m\sqrt{D}$, they are related to each other as indicated below.

$D_m = t_{1m} \times V/2$ $t_{1m} = V/\alpha_m$ $K_m{}^2 = V^2/D_m$

From these, $\alpha_m = K_m{}^2/2$

Thus, the acceleration is proportional to the square of the gain coefficient of the numerical speed converter. Accordingly, the acceleration can be modified by changing the coefficient of the converter. Denoting an acceleration interval until the speed V is reached with the acceleration $\alpha_1$ by $t_1$, the distance over which the acceleration takes place by D, the characteristic of the numerical speed converter by $V=K\sqrt{D}$ and $K=k_1 K_m$, the following relationships are obtained:

$t_1 = V/\alpha_1$, $D = Vt_1/2$ and $V = k_1 K_m \sqrt{D}$.

Thus we have $\alpha_1 = k_1{}^2 K_m{}^2/2 = k_1{}^2 \alpha_m$

A measure which is to be used in reducing the acceleration $\alpha_1$ during the advance positioning acceleration interval $t_1$ will be considered. Since the significance of reducing the acceleration will be lost if it results in imposing a stringent requirement upon the retracting speed waveform, it is assumed that the speed waveform for the retracting movement is on the same order as for the advancing movement. In this respect, a requirement that the advancing time $T_F$ is equal to half the period $T=L_0/V$ or less can be one measure.

Since there is a limit on the stroke of the machine or the maximum run length, it is another reasonable measure to assume that the run length from the home position to the end of the settling time $t_s$ remains constant at $L_H$ if the acceleration is reduced. From these, the following requirements are derived:

$$T_F = 2t_1 + t_s + t_c \leq T/2 = L_0/2V \tag{8}$$

$$(t_1/2 + t_s)V = L_H \tag{9}$$

$$\text{where, } t_1 = t_2 = V/k_1{}^2\alpha_m \tag{10}$$

The choice of $t_2=t_1$ facilitates a calculation. Since the machine of the kind involves a reduced loss, it is desirable to choose an equal magnitude for the acceleration so that the acceleration and the deceleration present a similar load.

$k_1$ represents the gain coefficient of the numerical speed converter, and there is a limit in reducing it. However, if a lower limit of 0.7 is chosen, the acceleration will be reduced by a factor of $0.7^2=0.49$.

In an embodiment of the invention, a choice is made from $k_1=1.0, 0.95, 0.9, 0.84, 0.77$ and $0.7$ ($k^{2_1}=1, 0.9, 0.8, 0.7, 0.6, 0.5$). For the sake of safety, a value greater than $k_1$ which is determined by the calculation is chosen. It is reasonable to choose $L_H$ to give a distance from the home position to the point where the cutting operation is initiated at $V_{MAX}$ or $L_H = (t_1/2 + t_s) V_{MAX}$.

Numerical Examples for Type A

Values of $t_s=0.1$ s, $t_c=t_{c0}=0.2$ s, and $L_H=(0.2/2+0.1)\times 2.5 = 0.5$ m ($V_{MAX}=2.5$ m/s) is substituted into the relationships given below, which are obtained from equations (8), (9) and (10).

$t_1 = 2(L_H/V - t_s)$, $k_1 = \sqrt{(V/t_1\alpha_m)}$ $T_F = 2t_1 + t_s + t_c \leq L_0/2V$.

In addition, using the relationships $\alpha_1 = k_1{}^2\alpha_m = k_1{}^2 \times 12.5$ m/s$^2$ and $t_1 = V/\alpha_1$, $t_1$, and $k_1$ for various values of V are obtained.

In addition, $\alpha_1$, $t_1$, $T_F$, $t_0$ and S (to be described later) for such $k_1$ are obtained. The results are indicated below.

| | | selected | | | | | minimum | |
|---|---|---|---|---|---|---|---|---|
| V | $t_1$ eq (9) | $k_1$ eq (10) | $k_1$ | $\alpha_1$ | $t_1$ | $T_F$ | $L_0$ eq (8) | S (to be described later) |
| 2.5 | 0.2 | 1.0 | 1.0 | 12.5 | 0.2 | 0.7 | 3.5 | 1.25 |
| 2.3 | 0.2348 | 0.883 | 0.9 | 10.13 | 0.227 | 0.754 | 3.47 | 1.21 |
| 2.1 | 0.2762 | 0.779 | 0.84 | 8.82 | 0.238 | 0.776 | 3.26 | 1.13 |
| 1.9 | 0.326 | 0.682 | 0.7 | 6.125 | 0.310 | 0.92 | 3.50 | 1.16 |

-continued

| | selected | | | | | | minimum |
|---|---|---|---|---|---|---|---|
| V | $t_1$ eq (9) | $k_1$ eq (10) | $k_1$ | $\alpha_1$ | $t_1$ | $T_F$ | $L_0$ eq (8) | S (to be described later) |
| 1.7 | unused | unused | 0.7 | 6.125 | 0.278 | 0.856 | 2.91 | 0.98 |
| 1.5 | " | " | 0.7 | 6.125 | 0.245 | 0.790 | 2.37 | 0.82 |
| 1.3 | " | " | 0.7 | 6.125 | 0.212 | 0.724 | 1.88 | 0.67 |
| 1.1 | " | " | 0.7 | 6.125 | 0.180 | 0.659 | 1.45 | 0.53 |

It is to be understood that if the given $L_0$ is shorter than the minimum $L_0$ which is determined from equation (8) for a given value of V and is located between it and $L_m$, $t_1$ and $k_1$ which are determined from equation (8) must be chosen instead of $k_1$ which is chosen from equations (9) and (10). (If $L_0 < L_m$, the cutting operation is impossible.)

For type B, equation (9) is replaced by the following equation:

$$(t_1/2+t_s+t_{c1})V=L_H \quad (11)$$

The waiting interval $t_{c1}$ is chosen as a measure for maintaining a run length until the termination constant. It is desirable if $t_1$ can be obtained which makes $t_{c1}=0$ in equation (11) as V is reduced, but if it is impossible to increase $t_1$ indiscriminately, the home position may be advanced to reduced the apparent $L_H$, thus effectively preventing an increase in $t_{c1}$.

However, the advance may be inhibited if a difficulty occurs in replenishing lubricant oil each time unless the home is fixed. Alternatively, a certain solution can be obtained by providing the home position at a plurality of locations.

Where the home position is advanced, the advanced length $\Delta L_H$ is determined by the following equation:

$$\Delta L_H = L_H - (t_1/2+t_s)V = t_{c1} \times V \quad (12)$$

On the other hand, there is a limit on the stroke. There is also a limit on the maximum run length. When this limit is denoted by $S_{MAX}$, and the advanced run length for $t_{c1}=0$ by $L_{2F}$, the following requirement:

$$S=L_{2F}+\Delta L_H=(t_1+t_s+t_c)V+\Delta L_H \leq S_{MAX} \quad (13)$$

must also be satisfied.

Numerical Examples for Type B

When the six values of $k_1$ including 1.0, 0.95, 0.9, 0.84, 0.77 and 0.7 are used, a value of $k_1$ which is close to the $k_1$ determined from the equations (10) and (11) may be chosen, but for the sake of safety, a greater value of $k_1$ is selected.

$\alpha_1 = k_1^2 \quad \alpha_m = k_1^2 \times 12.5$
$t_1 = V/\alpha_m$
$t_s = 0.1$
$t_c = t_{c1}+t_{c0} = t_{c1}+0.2$ Although a failure of $t_1$ which is obtained with a selected $k_1$ to satisfy equation (9) doesn't present a problem for Type A, equation (11) must be satisfied for Type B. It is assumed that $L_H = (0.2/2+0.1) \times 2.5 = 0.5$ m.

In the numerical examples, after $k_1$ reached the lower limit, the advance of the home position takes place according to equation (12).

| V | 2.5 | 2.3 | 2.1 | 1.9 | 1.7 | 1.5 | 1.3 | 1.1 |
|---|---|---|---|---|---|---|---|---|
| $t_1(1)$ | 0.2 | 0.2348 | 0.2762 | 0.326 | unused | unused | unused | unused |
| $k_1(2)$ | 1.0 | 0.883 | 0.779 | 0.682 | unused | unused | unused | unused |
| $k_1(3)$ | 1.0 | 0.9 | 0.84 | 0.7 | 0.7 | 0.7 | 0.7 | 0.7 |
| $\alpha_1$ | 12.5 | 10.13 | 8.82 | 6.125 | 6.125 | 6.125 | 6.125 | 6.125 |
| $t_1$ | 0.2 | 0.227 | 0.238 | 0.310 | 0.278 | 0.245 | 0.212 | 0.180 |
| $t_{c1}$ | 0 | 0.0039 | 0.0191 | 0.0082 | 0 | 0 | 0 | 0 |
| $\Delta L_H$ | 0 | 0 | 0 | 0 | 0.094 | 0.166 | 0.232 | 0.291 |
| $T_F$ | 0.7 | 0.758 | 0.795 | 0.928 | 0.856 | 0.79 | 0.724 | 0.66 |
| $L_0$ | 3.5 | 3.49 | 3.34 | 3.53 | 2.91 | 2.37 | 1.88 | 1.45 |
| S | 1.25 | 1.22 | 1.17 | 1.17 | 1.08 | 0.98 | 0.90 | 0.82 |

$t_1(1)$: calculation results of eq. (11)
$k_1(2)$: calculation results of eq. (10)
$k_1(3)$: values selected from 1.0, 0.95, 0.9 0.84, 0.77, 0.7
$L_0$: minimum value satisfying eq. (8)
$\Delta L_H$ is limited to a plurality of predetermined locations. Thus, it has a requirement, and when an advance as defined by $L_H$ given by equation (12) cannot be made, $t_{c1}$ according to equation (11) is developed.

For type C, depending on the distance $L_c$ from the home position to the delivery point, the following requirement arises:

$$(t_1/2+t_s+t_c)V=L_c \quad (14)$$

As mentioned previously, the machine is usually designed so that the cutting interval $t_c$ at $V_{MAX}$ involves only $t_{c0}$ and the conveying time is unnecessary. Thus, $L_c$ is determined as follows:

$L_c = (t_1/2+t_s+t_{c0}) V_{MAX}$

For $V<V_{MAX}$, if the acceleration remains at the maximum acceleration $\alpha_m$, $t_c=t_{c0}+t_{c2}$ increases as given in the numerical examples. However, it will be a measure for the achievement of a reduced acceleration that the acceleration be reduced so as to reduce $t_{c2}$ to as small a value as possible under the limitation defined by equation (13) while increasing $t_1$. If this is impossible to achieve with acceleration alone, the home position may be advanced by $\Delta L_H$, as given below.

$$\Delta L_H = L_c - (t_1/2+t_s+t_{c0})V = t_{c2} \times V \quad (15)$$

Numerical examples for Type C

As before, the six values of $k_1$ =1.0, 0.95, 0.9, 0.84, 0.77 and 0.7 are used. A value of $k_1$ which is close to the $k_1$ determined from equation (10) and equation (14) in which $t_c=t_{c0}=0.2$, and which is greater is selected for the sake of safety.

$\alpha_1 = k_1^2 \quad \alpha_m = k_1^2 \times 12.5$
$t_1 = V/\alpha_1$
$t_s = 0.1$
$t_c = 0.2+t_{c2}$
$L_c = (0.2/2 +0.1+0.2) \times 2.5 = 1$ m In the numerical examples, after $k_1$ reached its lower limit, the advance of the home position is made according to equation (15).

| V | 2.5 | 2.3 | 2.1 | 1.9 | 1.7 | 1.5 | 1.3 | 1.1 |
|---|---|---|---|---|---|---|---|---|
| $t_1(1)$ | 0.2 | 0.2696 | 0.3524 | unused | unused | unused | unused | unused |

-continued

| V | 2.5 | 2.3 | 2.1 | 1.9 | 1.7 | 1.5 | 1.3 | 1.1 |
|---|---|---|---|---|---|---|---|---|
| $k_1(2)$ | 1.0 | 0.826 | 0.690 | un-used | un-used | un-used | un-used | un-used |
| $k_1(3)$ | 1.0 | 0.84 | 0.7 | 0.7 | 0.7 | 0.7 | 0.7 | 0.7 |
| $\alpha_1$ | 12.5 | 8.82 | 6.125 | 6.125 | 6.125 | 6.125 | 6.125 | 6.125 |
| $t_1$ | 0.2 | 0.261 | 0.343 | 0.310 | 0.278 | 0.245 | 0.212 | 0.180 |
| $t_{c2}$ | 0 | 0.0043 | 0.0048 | 0 | 0 | 0 | 0 | 0 |
| $\Delta L_H$ | 0 | 0 | 0 | 0.136 | 0.254 | 0.366 | 0.472 | 0.58 |
| $T_F$ | 0.7 | 0.826 | 0.991 | 0.92 | 0.856 | 0.79 | 0.724 | 0.66 |
| $L_0$ | 3.5 | 3.80 | 4.16 | 3.50 | 2.91 | 2.37 | 1.88 | 1.45 |
| S | 1.25 | 1.30 | 1.36 | 1.30 | 1.24 | 1.18 | 1.14 | 1.19 |

$t_1(1)$: calculation results of eq. (14)
$k_1(2)$: calculation results of eq. (10)
$k_1(3)$: values selected from 1.0, 0.95, 0.9 0.84, 0.77, 0.7
$L_0$: minimum value satisfying eq. (8)

When $L_0$ is less than the minimum $L_0$ given above, $L_0$ and V are substituted in equation (8) to determine $t_1$. If some requirements on $\Delta L_H$ prevent the advance according to equation (15), $t_{c2}$ arises in accordance with equation (14). Where $S>S_{MAX}$, it is necessary to restrict to $t_1$, $k_1$ which satisfy the equation (13).

Retracting movement

During the advancing control, on-the-fly positioning must be made in tracking relationship with a stock under conditions as specified above. However, the only condition during the retracting control is that the retracting movement is completed before entering the advancing control.

Taking notice of this, the present invention provides a processing that allows a unique acceleration and a unique running speed to be selected for the retracting movement and another processing which allows any slight error in this selection, and the operation is transferred to the advancing movement without presenting any problems if only it occurs immediately before the termination of the retracting movement. The processing which allows a unique acceleration and a unique running speed to be selected will now be described.

$t_3$ interval

As in the retracting deceleration interval, the invention imposes a restriction on a slew rate for the retracting speed reference which is applied stepwise during the retracting acceleration interval $t_3$. Since there is no reason to choose a different acceleration from that during the retracting positioning deceleration interval $t_5$, the same acceleration $k_2^2\alpha_m$ (to be described later) as used during the interval $t_5$ is used.

$t_5$ interval

To reduce the acceleration $\alpha_5 = V_R/t_5$, $k_2<1$ may be multiplied to the coefficient of the numerical speed converter for the remaining length during the retraction in the similar manner as during the forward positioning acceleration interval $t_1$. Thus $\alpha_5 = k_2^2\alpha_m$, $t_5 = V_R/k_2^2\alpha_m$ $t_4$ interval During this interval, the holder is running with the retracting speed $V_R$, but this interval can be determined from the requirement that the retracting run length $L_{2R}$ be made equal to the advancing run length $L_{2F}$. Because $t_1=t_2$ and $t_3=t_5$, we have $$L_{2R}=(t_3+t_4)V_R=L_{2F} \quad (16)$$

$t_6$ interval

This represents a stop positioning interval, for which a choice of 0.1 s will be sufficient even though there is a variation depending on a variety of the machine. In actuality, $t_6$ must compensate for variations in all of $t_1$, $t_s$, $t_c$, $t_2$, $t_3$, $t_4$, $t_5$, and thus $t_6$ varies because $T=L_0/V$ does not change.

$k_2, V_R$

Accordingly, any acceleration $k_2^2\alpha_m$ and any speed $V_R$ may be used which satisfy the completion of the retracting movement during $T_R=T-T_F$ or equation (16). It is preferred that the acceleration as well as the speed be lower in order to be tenable for the machine.

$T_R=t_3+t_4+t_5+t_6=T-T_F$
$t_3=t_5=V_R/k_2^2\alpha_m$

From equation (16), we have $t_4=L_{2F}/V_R-t_3$. From these equations we have $$T=L_0/V=T_F+L_{2F}/V_R+V_R/k_2^2\alpha_m+t_6 \quad (17)$$

A control which is tenable to the machine can be realized when a small value for $k_2$ and a small value for $V_R$ are chosen as far as $t_6 > \approx 0.1$ is satisfied in equation (17).

DESCRIPTION OF PREFERRED EMBODIMENT

Figure 4:
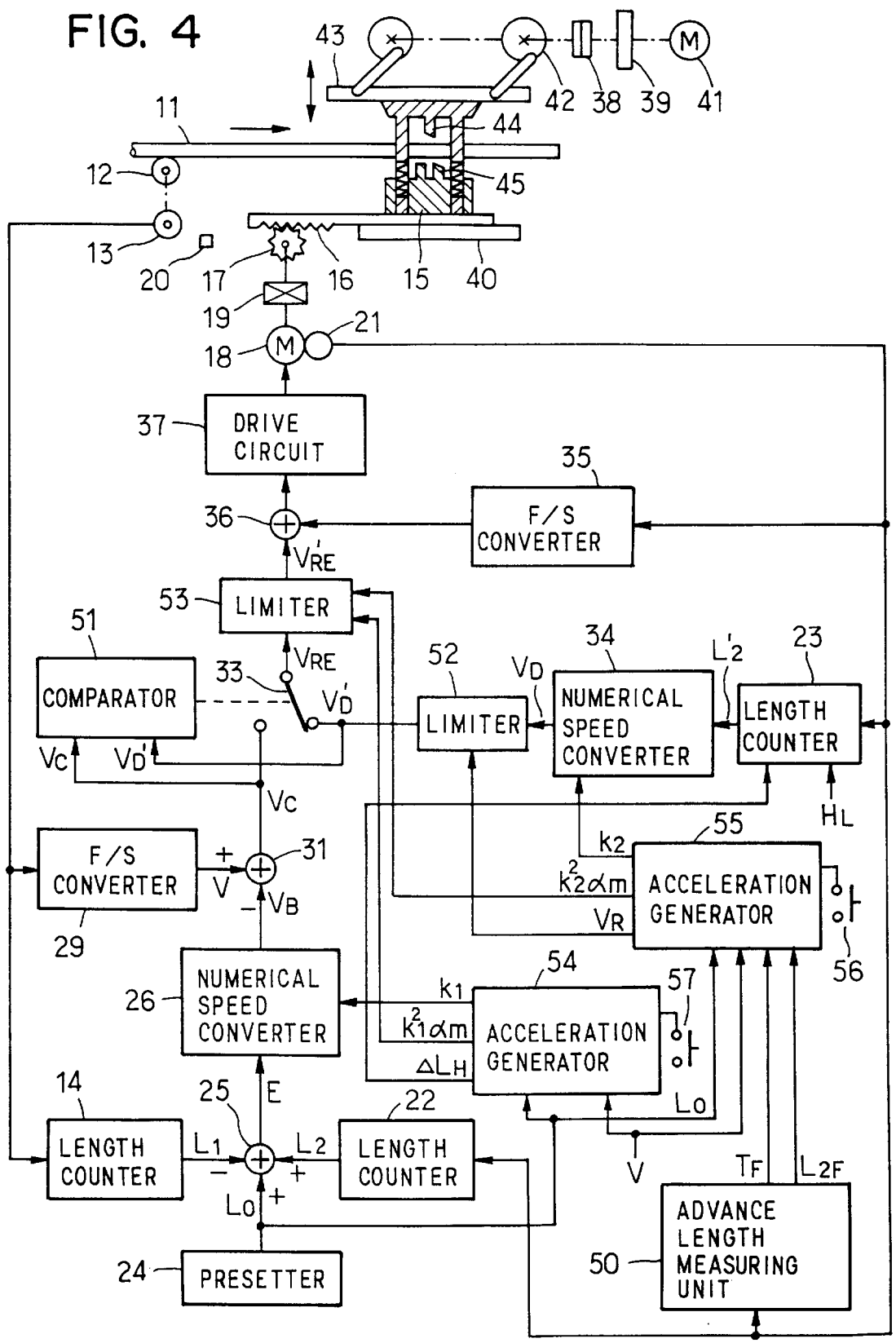
FIG. 4 is a block diagram showing a functional arrangement of a control system which implements the process according to the invention.

An embodiment of the invention as applied to a cutter will be described with the reference to FIG. 4. In FIG. 4, parts corresponding to those shown in FIG. 1 are designated by like reference numerical and characters.

The description will begin from conditions corresponding to the stop positioning interval $t_6$. At this time, a comparator 51 causes a change-over switch 33 to select an output $V_D'$ from a limiter 52 as the speed reference $V_{RE}$. The limiter 52 is only effective to limit an input $V_D$ from a numerical speed converter 34 to a magnitude of $V_R$. When at rest, or $V_D=V_D'\approx 0$. A limiter 53 limits a slew rate of $t_2$ to $k_1^2\alpha_m$ when the input $V_{RE}$ is positive and is decreasing, limits a slew rate of $t_3$ to $k_2^2\alpha_m$ when the input is negative and decreasing, and do any other limiting action whatsoever. During the interval $t_5$, the numerical speed converter 34 delivers an output $V_D'=k_2K_m\sqrt{L_2'}$ (where $K_m$ represents a coefficient for the maximum acceleration $\alpha_m$) in response to an input $L_2'$. Thus, the acceleration to reduce $V_D$ as $L_2'$ is reduced is chosen to be $k_2{}^2K_m$. A length counter 23 is preset by a home sensor to a distance $H_L$ from the position of the home sensor to the home. If $\Delta L_H$ is delivered, the counter is preset to $H_L-\Delta L_H$, and in this manner, the home position is variable, choosing an alternate home at a distance of $H_L$ or $H_L$ plus $\Delta L_H$ advanced from the sensor.

The remaining length $E=L_0-L_1+L_2+e_0$ decreases, and $V_B$ also decreases while $V_C$ increases towards V. A numerical speed converter 26 delivers an output $V_B=k_1k_m\sqrt{E}$ in response to an input E.

Figure 1:
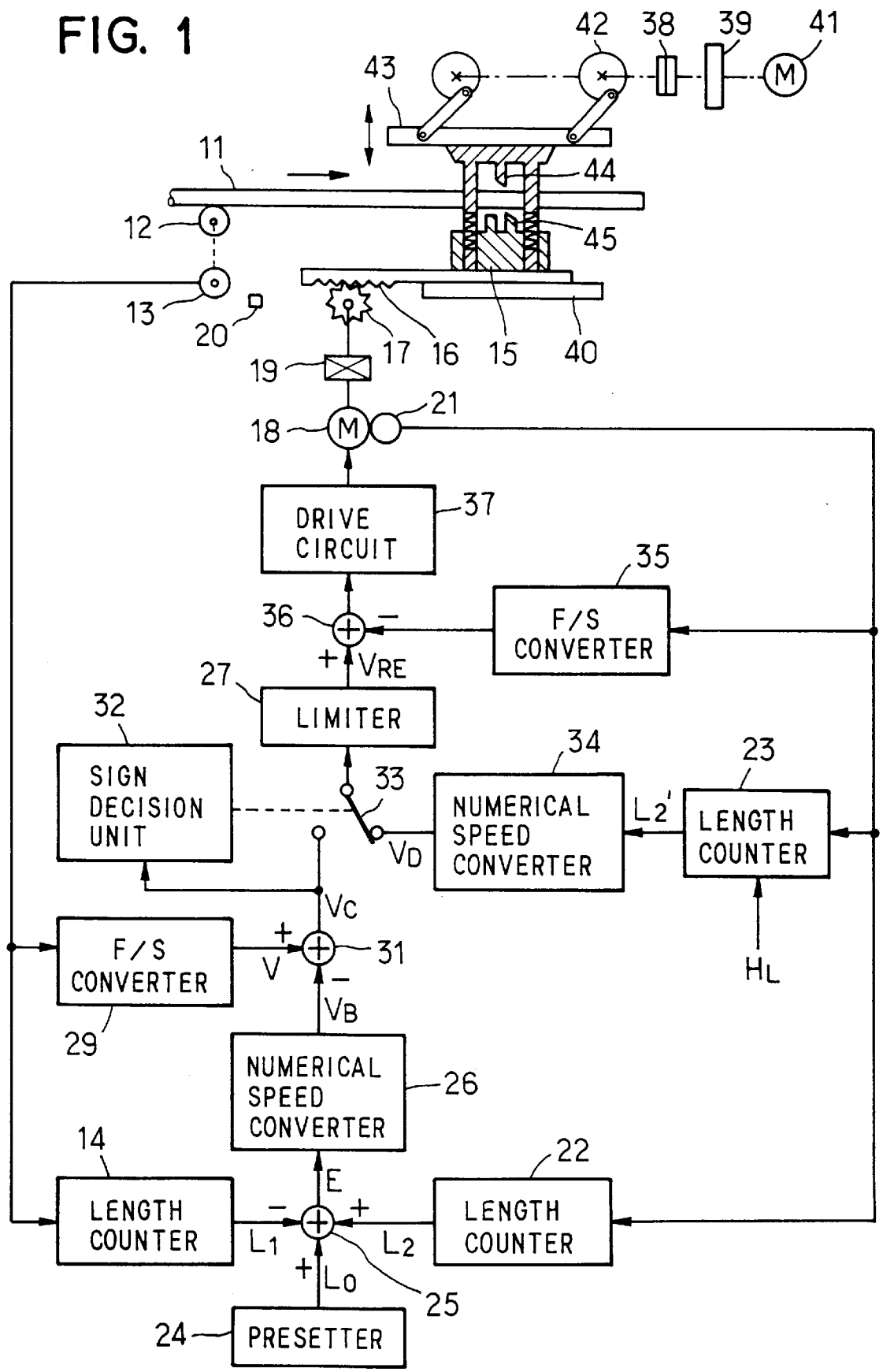
FIG. 1 is a block diagram of a functional arrangement of control system which implements a conventional process.
Figure 2B:
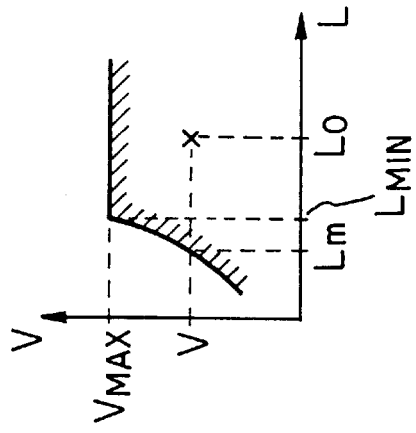
FIG. 2B is a diagram indicating a relationship between a preset length L which can be treated and a stock running speed V.
Figure 2D:
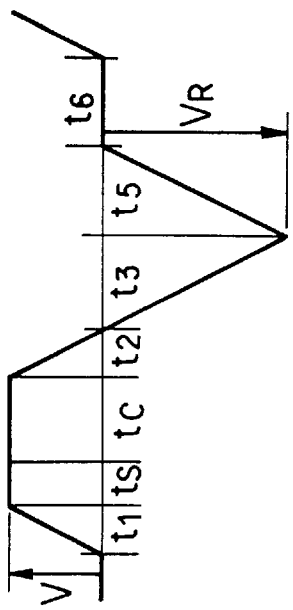
FIG. 2D is a diagram of a controlled speed waveform according to the conventional process for the shortest cut length when the stock running speed V is below the maximum value $V_{MAX}$.
Figure 2A:
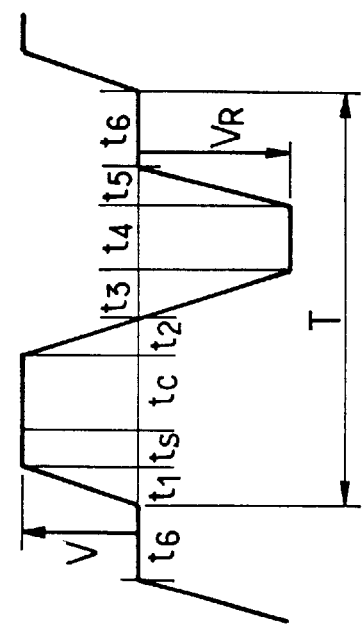
FIG. 2A is a diagram indicating a controlled speed according to the conventional process.
Figure 2C:
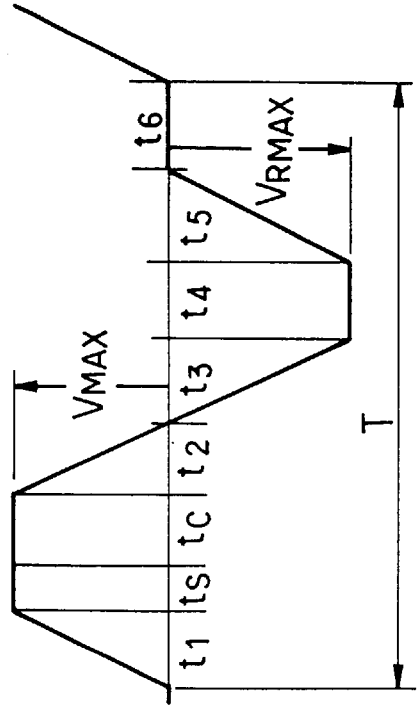
FIG. 2C is a diagram of a controlled speed waveform according to the conventional process for the shortest cut length when the stock running speed is at its maximum value $V_{MAX}$.
Figure 3:
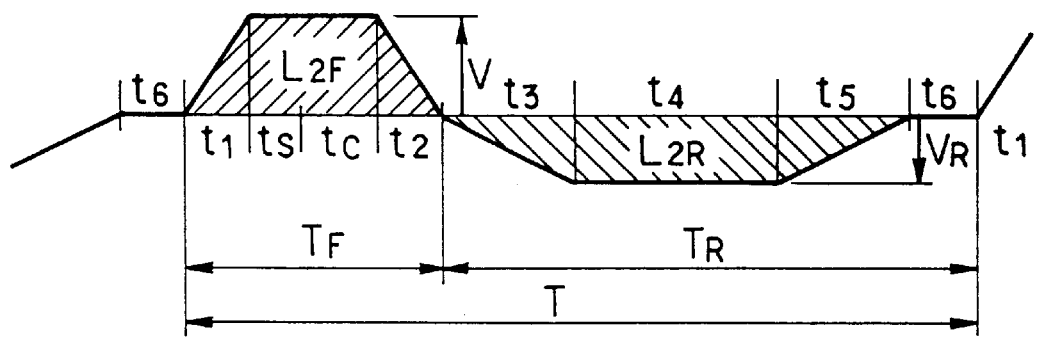
FIG. 3 is a diagram showing an example of a controlled waveform according to the process of the invention.

In distinction to the sign decision unit used in the prior art as shown in FIG. 1, a comparator 51 algebraically compares the magnitude of $V_D$ and $V_D'$ inclusive of the sign, and changes the switch 33 so as to select a greater one of them.

Since $V_D=V_D'\approx 0$ during the stop positioning interval $t_6$, the comparator 51 changes the switch from $V_D'$ to $V_C$ at the time $V_C>0$. However, the comparator 51 changes the switch 33 to select $V_C$ if the holder does not come to a stop, but assumes a condition which immediately precedes such condition when the retraction deceleration is continuing, or when $V_C \geqq V_D'$ algebraically while $V_D<0$, but $V_C<0$. Accordingly, at any event, the advancing acceleration is entered in response to an increase in $V_C$, and the resulting acceleration will be $k_1{}^2 \alpha_m$ corresponding to the coefficient of the numerical speed converter 26. At the termination of the acceleration, a treatment command is issued to initiate a treatment at the instant the settling interval $t_s$ is passed as by reading a change in $V_B$, for example. However, the manner of issuance depends on the type of the machine.

For type A, the actual cutting interval $t_{c0}$ is immediately initiated.

For type B, the same choice is made as for type A except that a running to the position where the treatment is initiated is additionally required.

For type C, it is common to make the same choice as for the type A, but a requirement is applied to a retracting command upon completion of the treatment.

Upon receiving the retracting command from the machine, length counters 14, 22 are cleared, and hence, $V_B$ increases rapidly while $V_C$ decreases rapidly to a negative value. When $L_1$ and $L_2$ are cleared, the residual deviation $e_0$ of the remaining length E and preset length or next $L_0$ are read, and are informed to a $k_1$ generator 54 and a $k_2$ generator 55 together with the line speed V. $k_1$ generator 54 calculates $k_1$ and $k_1{}^2\alpha_m$ in accordance with equations (8), (9), (10), (11) and (13), and also calculates $\Delta L_H$ in accordance with equations (12), (15). Calculated $k_1$ is applied to the numerical speed converter 26 while $k_1{}^2\alpha_m$ is applied to the limiter 53, and $\Delta L_H$ is applied to the length counter ($L_2'$) 23. Means which calculates such values each time may be used for the $k_1$ generator 54, but the latter may comprise a memory storing pre-calculated values.

Since the cutter holder 15 is advancing, $L_2'$ assumes a high value and $V_D'$ assumes a negative high value. However, the output $V_D'$ from the limiter 52 is limited to a negative value which is equal to $V_R$. Nevertheless, since the negative value of $V_C$ is high, and there occurs a rapid change to $V_D'>V_C$, the comparator 51 causes the selection of $V_{RE}$ by the switch 33 to be switched from $V_C$ to $V_D'$. Since a negative value is applied to the limiter 53, there occurs a rapid decrease from the previous value of $V_C \approx V$, but the rate of reduction is suppressed to $k_1{}^2\alpha_m$, and subsequently the output gradually converges to zero. An advance length measuring unit 50 determines an advancing time $T_F$ and an advancing run length $L_{2F}$. The advancing run length $L_{2F}$ is determined on the basis of the time $T_F$ during which a motor encoder 21 is rotating in the forward direction and the pulse developed during such time. These results $T_F$ and $L_{2F}$ as well as the preset treating length $L_0$ and preset line speed (stock speed)V are fed to the $k_2$ generator 55. The $k_2$ generator 55 calculates $k_2$ and $V_R$ in accordance with equation (17). It is preferred that six values of $k_2$ are used and that $V_R$ be calculated using a value smaller than $k_1$ for the advance as a parameter. The $k_2$ generator 55 may comprise means for calculating $k_2$ and $V_R$ for each cut, but may also comprise a memory storing pre-calculated values.

The speed reference $V_{RE}$ reduces from zero to a negative value, and after it is limited to $V_R$, as the holder approaches the home position, it passes the home sensor 20, whereupon the length counter ($L_2'$) 23 is preset to the distance $H_L-\Delta L_E$ to the home position. As the count in the length counter ($L_2'$) 23 decreases and $V_D$ reduces below $V_R$, the deceleration positioning mode is entered to anticipate the stop positioning interval $t_6$. However, the determination of $t_F$, $L_{2F}$ as well as $k_2$ and $V_R$ generated by the $k_2$ generator 55 involve errors, and hence it is possible on account of these errors to cause $V_C \geqq V_D'$ during the retracting movement. In such instance, the speed reference is switched to $V_C$, and the retracting speed decreases with the acceleration $k_1{}^2\alpha_m$ to pass through the stop before entering the advancing acceleration, thus presenting no trouble.

Results of calculations by the generators 54, 55 or the content stored in a memory are modified or subject to a fine adjustment during an on-site trial run. At this end, it is convenient to modify $k_1$, $k_2$ and in particular, $V_R$ by a manual intervention through push-buttons 56, 57 on site by using memories for the generators 54,55. Since $t_s$ and $t_c$ are obtained in the advance length measuring unit 50, $k_1$ obtained by $k_1$ generator 54 may be used to determine $t_1$, thus calculating $2t_1+t_s+t_c=T_F$.

As mentioned previously in connection with FIG. 1, the control function which is shown in terms of hardware for the most part in FIG. 4 can be implemented in terms of software by using a computer.

Figure 5A:
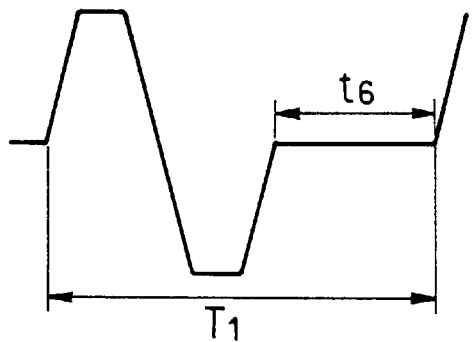
FIGS. 5A and 5C are diagrams showing the controlled speed waveforms according to the conventional process.
Figure 5B:
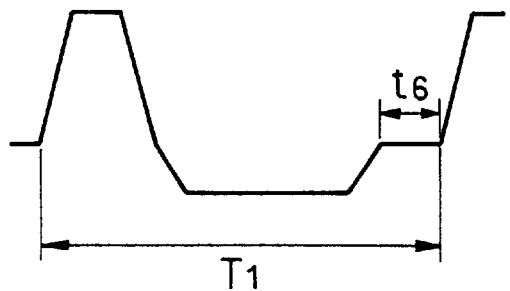
FIGS. 5B and 5D are diagrams showing the controlled speed waveforms according to the process of the invention, which correspond to FIGS. 5A and 5C.

To give an example, for an arrangement including a stock running speed V of 2 m/s and a preset treating length L of 4.8 m, the acceleration $\alpha_m$ is chosen to be equal to 10 m/s$^2$ for both the advancing and retracting movement according to the prior art, and the retracting speed $V_R$ is chosen to be equal to 2 m/s or equal to V. The resulting speed waveform is illustrated in FIG. 5A. By contrast, when the present invention is applied, the advancing acceleration is chosen to be equal to 10 m/s$^2$, which is the same as chosen according to the prior art, but the retracting acceleration is chosen to be equal to 5 m/s$^2$ and the retracting speed $V_R$ is chosen to be equal to 0.75 m/s. In this manner, the speed waveform as shown in FIG. 5B can be used for the control. Thus the stop positioning interval $t_6$ used in the prior art is shortened, and the retracting acceleration and the retracting speed are decreased by a corresponding amount to achieve a retracting control which is tenable for the machine as compared with the prior art.

Figure 5C:
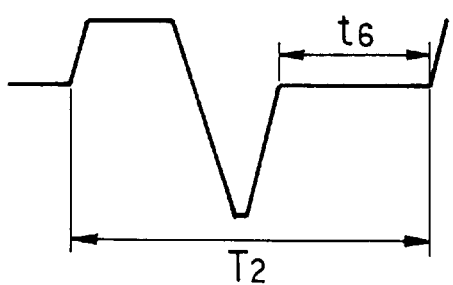
Figure 5D:
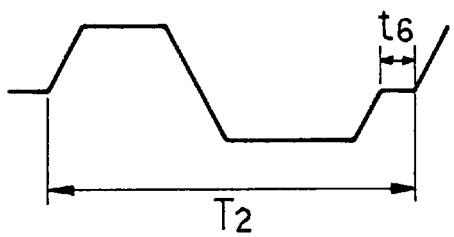

To give another example, where the stock running speed V is equal to 1 m/s and a preset treating length $L_0$ is equal to 2.2 m, according to the prior art, the retracting speed $V_R$ is chosen to be 2 m/s, and the advancing acceleration and the retracting acceleration are both chosen to be $\alpha_m=10$ m/s$^2$, thus performing the control with the speed waveform shown in FIG. 5C. By contrast, when the invention is applied, a retracting speed $V_R$ of 0.75 m/s, and an advancing acceleration and a retracting acceleration both of 5 m/s$^2$ may be used, for example, thus performing the control with the speed waveform in FIG. 5D. In this instance again, $t_6$ is shorter than in the prior art, and both the advancing and the retracting acceleration can be reduced as compared with the prior art, achieving a control which is substantially tenable for the machine.

As mentioned previously, the invention is applicable not only to the control of a back-and-forth running cutter, but is also applicable to on-the-fly treatment with respect to a running stock by mounting a variety of treating mechanisms such as a boring, a notching, a printing, a heating or an overlay applying mechanism on a treating carriage, and by causing the carriage to run back and forth along the running stock. In such an instance, the "cutter" described in the embodiment may be construed as a "treating mechanism" and the "cutting" construed as "treating", and what has been described above is directly applicable to such a back-and-forth running treating machine.

From the foregoing, it will be seen that the invention enables a numerical control which is tenable for the machine by allowing as small an acceleration as possible and as small a retracting speed as possible to be automatically chosen on the basis of the stock speed V and the preset treating length $L_0$.

What is claimed is:

1. A process of controlling a numerically controlled back-and-forth running treating machine in which a difference between a stock run length $L_1$ and a run length of the treating machine $L_2$ is subtracted from a preset treating length $L_0$ to define a remaining length, which is then converted into a speed to provide a remaining length speed, which is in turn subtracted from a stock running speed to provide a speed reference and in which the treating machine enters an acceleration mode as the remaining length is reduced towards zero and performs an on-the-fly treatment while tracking the stock in the vicinity of zero remaining length;

the process being characterized in that at least one of an advancing acceleration, a retracting acceleration and a retracting speed of the treating machine is modified in accordance with a treating period T which is determined by the preset treating length $L_0$ and the stock running speed V and also in accordance with the stock running speed V.

2. A process according to claim 1 in which the treating machine is allowed to run during as long an interval as possible of a portion of the treating period T which remains after excluding a minimum positioning settling time $t_s$ and an interval $t_c$ required for the treatment from the treating period T and in the vicinity of zero remaining length and in which the modification is made such that a coefficient k which determines an advancing and a retracting acceleration of the treating machine is reduced to provide as small an acceleration as possible and to provide as small a retracting speed $V_R$ as possible.

3. A process according to claim 1 in which a plurality of accelerations which can be used are previously determined, and in which the modification takes place by selecting a smallest value of the acceleration which can be used and which provides an advancing time for the treating machine which is equal to or less than half the treating period.

4. A process according to claim 1 in which a plurality of accelerations which can be used are previously determined and in which the modification takes place by selecting a smallest value of the acceleration which can be used and that is necessary from the initiation of the advancing movement of the treating machine until a given position such as a point where the treatment is initiated or a point where the retracting movement is initiated is reached.

5. A process according to claim 4 in which the selection is made in a range in which the advancing run length of the treating machine is equal to or less than a maximum possible advancing run length.

6. A process according to claim 4 in which for a variety of machine which requires a positioning interval either before or after the treatment in the interval $t_c$ which is required for the treatment, the position where the advancing movement of the treating machine is initiated is advanced by an amount corresponding to the product of the positioning interval either before or after the treatment and the stock running speed V.

7. A process according to one of claims 1 to 6 in which a plurality of retracting accelerations which can be used and a plurality of retracting speeds are previously determined and in which the modification is made by selecting a retracting acceleration and a retracting speed which provide a stock positioning interval $t_6$ for the treating machine which is equal to or greater than a minimum interval within the rest formed by subtracting the advancing time $T_F$ of the treating machine from the treating period T.

8. A process according to claim 7 in which the modification is made by reading out a retracting acceleration and a retracting speed from a memory using an address which includes a preset treating length $L_0$, a stock running speed V, an advancing time $V_F$ of the treating machine and a distance $L_{2F}$ by which the treating machine is advanced.

9. A process according to one of claims 1 to 6 in which the modification is made by reading out an advancing acceleration from a memory using an address including a preset treating length $L_0$ and a stock running speed V.

10. A process of controlling a numerically controlled back-and-forth running treating machine in which a difference between a stock run length $L_1$ and a run length of $L_2$ of the treating machine is subtracted from a preset treating length $L_0$ to define a remaining length, which is then converted into a speed to provide a remaining length speed, which is in turn subtracted from a stock running speed to provide a speed reference, and in which the treating machine enters an acceleration mode as the remaining length is reduced toward zero and performs an on-the-fly treatment while tracking the stock in the vicinity of zero remaining length;

the process being characterized by a step of establishing an acceleration less than a maximum allowable acceleration in accordance with the preset treating length $L_0$ and the stock running speed V.

* * * * *